UNITED STATES PATENT OFFICE.

CARLETON ELLIS, OF LARCHMONT, NEW YORK, ASSIGNOR, BY MESNE ASSIGNMENTS, TO FULTON CHEMICAL COMPANY.

INSECTIFUGE.

No. 901,083.  Specification of Letters Patent.  Patented Oct. 13, 1908.

Application filed November 9, 1907. Serial No. 401,517.

*To all whom it may concern:*

Be it known that I, CARLETON ELLIS, a citizen of the United States, residing at Larchmont, in the county of Westchester and State of New York, have invented certain new and useful Improvements in Insectifuge, of which the following is a specification.

This invention relates to a composition for repelling moths and preventing their destructive action on textile material, etc., and relates particularly to absorbent granular material impregnated with active organic bodies. The use of granular absorbent material permits of the cheap application of otherwise expensive active organic agents in a form which makes them non-injurious to textile material.

An illustrative formula comprises 20 parts of carnauba wax and 10 parts of ceresin wax, which are melted and mixed with 5 parts of oil of cedar wood, 3 parts of oil of cedar leaf, 2 parts of heavy oil of camphor and 5 parts of methyl salicylate. This oil and wax mixture is cooled and when thoroughly solid is pulverized. Seven parts, by weight, of this mixture are then mixed with six parts, by weight, of sawdust which has passed a 20-mesh sieve. This mixture is heated to a temperature sufficient to melt the waxy composition, thereby causing impregnation of the sawdust material.

Another illustrative formula comprises naphthalene 30 parts, oil of cedar leaf 10 parts and sawdust 60 parts. The oil of cedar leaf is melted with naphthalene and the mixture then cooled and pulverized. Sawdust should be preferably employed which has passed a 20-mesh sieve. Ordinary pine sawdust is sufficient for the purpose. The retentive properties of the sawdust are increased by charring slightly and for this purpose it may be heated with agitation in a suitable receptacle such as a rotating drum or cylinder until it has become slightly discolored. The pulverized naphthalene and oil mixture is intimately mixed with the sawdust and the mass heated until the sawdust has substantially absorbed the naphthalene and oil.

Other active agents may be similarly employed, those specified above being especially efficient for this purpose. Cedar wood sawdust may be used.

Having described my invention, to the details of which I of course do not limit myself, what I claim is:

1. An insectifuge comprising granular absorbent material, including sawdust carrying insectifugal material of an oily character including oil of cedar leaf, and insectifugal material of a crystalline character including naphthalene.

2. An insectifuge comprising absorbent organic material, including sawdust, impregnated with oil of cedar leaf, and naphthalene.

3. An insectifuge comprising charred sawdust impregnated with naphthalene and oil of cedar leaf, substantially as described.

4. An insectifuge comprising absorbent organic material, including sawdust in a slightly charred condition, impregnated with essential oil material including oil of cedar leaf, and naphthalene.

In testimony whereof I have affixed my signature in presence of two witnesses.

CARLETON ELLIS.

Witnesses:
NATHANIEL L. FOSTER,
HENRIETTA BERKURTZ.